United States Patent
Baker et al.

(10) Patent No.: US 10,407,087 B1
(45) Date of Patent: Sep. 10, 2019

(54) VEHICLE DOOR REMOVAL AND STORAGE DOLLY

(71) Applicants: Bob Baker, Centerton, AR (US); Jenea Law, Cave Springs, AR (US)

(72) Inventors: Bob Baker, Centerton, AR (US); Jenea Law, Cave Springs, AR (US)

( * ) Notice: Subject to any disclaimer, the term of this patent is extended or adjusted under 35 U.S.C. 154(b) by 0 days.

(21) Appl. No.: 15/813,412

(22) Filed: Nov. 15, 2017

Related U.S. Application Data (60) Provisional application No. 62/422,177, filed on Nov. 15, 2016.

(51) Int. Cl.
| | | |
|---|---|---|
| *B62B 3/10* | (2006.01) | |
| *B62B 3/02* | (2006.01) | |
| *B62B 3/06* | (2006.01) | |
| *B62B 3/00* | (2006.01) | |

(52) U.S. Cl.
CPC ............. *B62B 3/108* (2013.01); *B62B 3/005* (2013.01); *B62B 3/02* (2013.01); *B62B 3/0612* (2013.01); *B62B 3/0625* (2013.01); *B62B 3/0643* (2013.01)

(58) Field of Classification Search
CPC ....... B62B 3/108; B62B 3/005; B62B 3/0625; B62B 3/02; B62B 3/0612; B62B 3/0643
See application file for complete search history.

(56) References Cited

U.S. PATENT DOCUMENTS

| | | | | |
|---|---|---|---|---|
| 2,650,731 A | * | 9/1953 | Adler | B62B 5/0003 104/246 |
| 2,691,450 A | * | 10/1954 | Rosenbaum | B60P 1/6436 104/167 |
| 2,799,920 A | * | 7/1957 | Hansen | B21D 1/12 157/1.17 |
| 2,803,872 A | * | 8/1957 | Massa | B25H 1/0007 269/106 |
| 2,815,132 A | * | 12/1957 | Stone | B62B 3/04 182/141 |
| 2,908,403 A | * | 10/1959 | Browder, Jr. | B25H 1/0007 269/151 |
| 2,955,632 A | * | 10/1960 | Stone | E04F 21/0023 269/17 |
| 3,892,385 A | * | 7/1975 | Andrist | B66F 5/00 254/133 R |
| 3,923,167 A | * | 12/1975 | Blankenbeckler | B25H 1/00 414/11 |
| 4,042,208 A | * | 8/1977 | Arakaki | B62B 1/26 254/134 |
| 4,180,252 A | * | 12/1979 | Cushenbery | B23Q 1/5468 254/122 |
| 4,183,511 A | * | 1/1980 | Marek | B66C 23/48 254/100 |
| 4,530,492 A | * | 7/1985 | Bork | B25B 5/142 269/17 |

(Continued)

*Primary Examiner* — Jacob B Meyer
(74) *Attorney, Agent, or Firm* — Keisling and Pieper PLC; David B. Pieper (57) ABSTRACT

A vehicle door removal and storage dolly using a height controllable upper frame with side extending door support platforms that allows the vehicle doors to be positioned both vertically and horizontally for installation and removal from a vehicle. The extending door platforms are planarly aligned for a compacted position and include padded vertical door supports for supporting the vehicle doors during storage periods.

10 Claims, 11 Drawing Sheets

(56) References Cited

U.S. PATENT DOCUMENTS

| | | | | |
|---|---|---|---|---|
| 4,538,796 A | * | 9/1985 | Steck | B66F 5/00 269/17 |
| 4,676,491 A | * | 6/1987 | Radlof | B25H 1/0007 269/296 |
| 4,810,151 A | * | 3/1989 | Shern | B62B 3/108 269/17 |
| 4,932,639 A | * | 6/1990 | Fjellstrom | B66F 3/08 254/100 |
| 4,961,257 A | * | 10/1990 | Sakamoto | B62D 65/06 29/822 |
| 5,009,406 A | * | 4/1991 | McDermott | B25H 1/0007 269/17 |
| 5,018,931 A | * | 5/1991 | Uttley | A61G 7/08 188/5 |
| 5,040,290 A | * | 8/1991 | Usui | B62D 65/06 29/281.1 |
| D325,505 S | * | 4/1992 | Hernandez | D8/71 |
| 5,135,205 A | * | 8/1992 | Bedard | B25H 1/0007 254/100 |
| 5,262,706 A | * | 11/1993 | Hollingsworth | B21J 13/085 254/126 |
| 5,269,501 A | * | 12/1993 | Liegel | B66F 9/06 212/292 |
| 5,294,098 A | * | 3/1994 | Bundy | B25H 1/0007 254/134 |
| 5,299,659 A | * | 4/1994 | Imbeault | B66B 9/16 187/244 |
| 5,346,355 A | * | 9/1994 | Riemer | B60P 1/4435 224/310 |
| 5,400,720 A | * | 3/1995 | Stevens | A47B 9/16 108/147 |
| 5,915,742 A | * | 6/1999 | Hung | B25B 11/02 269/17 |
| 6,024,348 A | * | 2/2000 | Ventura | B05B 13/0285 269/104 |
| 6,092,787 A | * | 7/2000 | Nayman | B25H 1/0014 254/10 R |
| 6,113,090 A | * | 9/2000 | Hui | B60J 5/0468 269/296 |
| 6,431,319 B1 | * | 8/2002 | Myers | B62B 3/02 187/243 |
| 7,008,165 B1 | * | 3/2006 | Grimes | B62B 3/108 269/17 |
| 7,008,166 B1 | * | 3/2006 | Grimes | B66C 23/48 254/114 |
| 7,014,413 B2 | * | 3/2006 | Young | B62B 3/108 269/905 |
| 7,175,168 B2 | * | 2/2007 | Hardaker | B64F 5/50 244/1 R |
| 7,188,843 B2 | * | 3/2007 | Magness | B25H 5/00 280/30 |
| 7,243,904 B1 | * | 7/2007 | Grimes | B66C 23/48 254/2 B |
| 7,775,513 B2 | * | 8/2010 | Desfosses | B65H 1/00 270/52.16 |
| 8,132,310 B2 | * | 3/2012 | Suga | B62D 65/06 269/37 |
| 8,256,811 B2 | * | 9/2012 | Yeum | B25J 15/0061 269/905 |
| 8,540,273 B2 | * | 9/2013 | Dobrachinski | B62B 3/027 280/47.34 |
| 9,238,477 B2 | * | 1/2016 | Ahern | B62D 5/0457 |
| 9,540,220 B2 | * | 1/2017 | Stewart | B66F 7/0625 |
| 9,555,309 B1 | * | 1/2017 | LaBar | A63B 21/0724 |
| 9,815,672 B2 | * | 11/2017 | Baudermann | B66F 7/0625 |
| 10,260,296 B2 | * | 4/2019 | Riggs | E21B 21/065 |
| 2003/0190219 A1 | * | 10/2003 | Young | B62B 3/108 414/11 |
| 2006/0151252 A1 | * | 7/2006 | Joos | B66B 9/04 187/269 |
| 2006/0225955 A1 | * | 10/2006 | Murphy | B66F 11/042 182/69.5 |
| 2008/0273953 A1 | * | 11/2008 | Bodem | B62B 3/108 414/382 |
| 2010/0310346 A1 | * | 12/2010 | Polidoros | B62B 3/04 414/523 |
| 2011/0262261 A1 | * | 10/2011 | Stewart | B66F 7/0625 414/800 |
| 2014/0027693 A1 | * | 1/2014 | Hallman | B66F 5/00 254/8 C |
| 2016/0257328 A1 | * | 9/2016 | Myers | B62B 3/0606 |
| 2017/0151491 A1 | * | 6/2017 | Collins | A63C 19/12 |
| 2018/0015940 A1 | * | 1/2018 | Walkner | B62B 3/0631 |

* cited by examiner

FIG. 11

VEHICLE DOOR REMOVAL AND STORAGE DOLLY

CROSS-REFERENCE TO RELATED APPLICATIONS

This application claims priority to and is a continuation-in-part of U.S. Provisional Application Ser. No. 62/422,177 filed on Nov. 15, 2016. Each of these prior applications is incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in vehicle door removal. More particularly, the invention relates to improvements particularly suited for providing a vehicle door dolly for use in removing and replacing multiple vehicle doors. In particular, the present invention relates specifically to a vehicle door removal and storage dolly for use with lift off doors such as those commonly found on off road vehicles.

2. Description of the Known Art

As will be appreciated by those skilled in the art, dollies are known in various forms. Patents disclosing information relevant to moving doors includes: U.S. Pat. No. 4,530,492, issued to Bork on Jul. 23, 1985 entitled Apparatus for supporting vehicle body parts; U.S. Pat. No. 2,955,632, issued to Stone on Oct. 11, 1960 entitled Rotatable door supporting and lifting jig; U.S. Pat. No. 4,932,639, issued to Fjellstrom on Jun. 12, 1990 entitled Door and body jack; and U.S. Pat. No. 7,243,904, issued to Grimes on Jul. 17, 2007 entitled Door lifting apparatus and method. Each of these patents is hereby expressly incorporated by reference in their entirety.

For illustrative purposes, the present invention shows a vehicle 10 in the drawings that is depicted as a JEEP WRANGLER (both trademarks owned by FCA US LLC). The vehicle 10 has a body 11 including removable doors 12. The doors 12 may be mounted on vertically separable or lift off hinges 14 with a body hinge part 16 and a door hinge part 18. The removable doors 12 include a door bottom 20 and can include a window opening 13 at the door top 30. Note that for removal of the doors 12, other items known in the art that need to be disconnected may include hinge pin screws, nuts, doorlatches, safety straps, electrical connections, and other items depending on the vehicle.

From these prior references it may be seen that these prior art patents are very limited in their teaching and utilization, and an improved vehicle door removal and storage dolly is needed to overcome these limitations.

SUMMARY OF THE INVENTION

The present invention is directed to an improved vehicle door removal and storage dolly using a lower base frame supported off of rollable caster wheels. The lower base frame supports a hydraulically actuated scissor lift the moves an upper frame. The hydraulic actuator is operated by a foot lever to do the pumping action and a hand lever on a raised handle is used to provide fine control of reducing the actuator extension and lowering the upper frame. The upper frame has multiple side sliding shelves with vertical door supports so that one door may be stored on the dolly while another door is being removed or installed.

One object of the present invention is provide a simple to use door removal dolly. Another object is to provide a storage system for the door when removed from the vehicle. A still further object is to make the doors and dolly easily transportable. Yet another advantage and object is to provide a compact multiple door dolly. Another advantage is found in providing a system that does not require lifting of the door or complicated securing system the door removal dolly and storage system.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
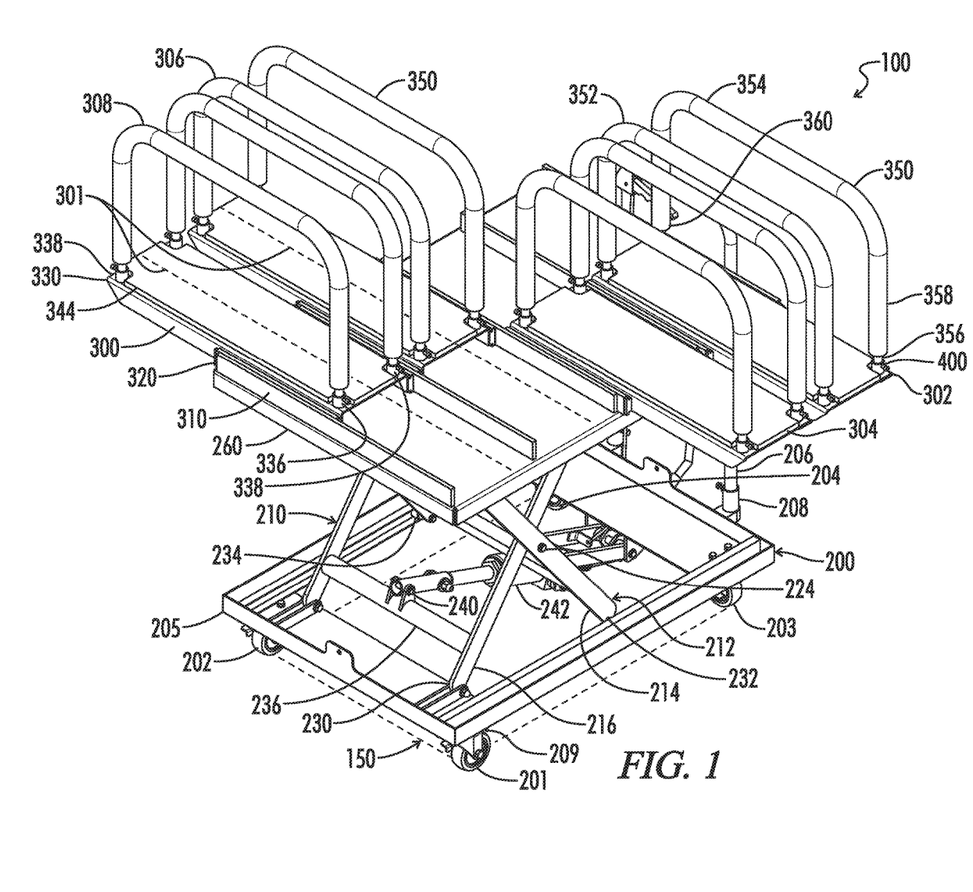
FIG. 1 is a perspective view of a vehicle door removal and storage dolly in a vertically raised position with all of the door support platforms in an extended position.
Figure 2:
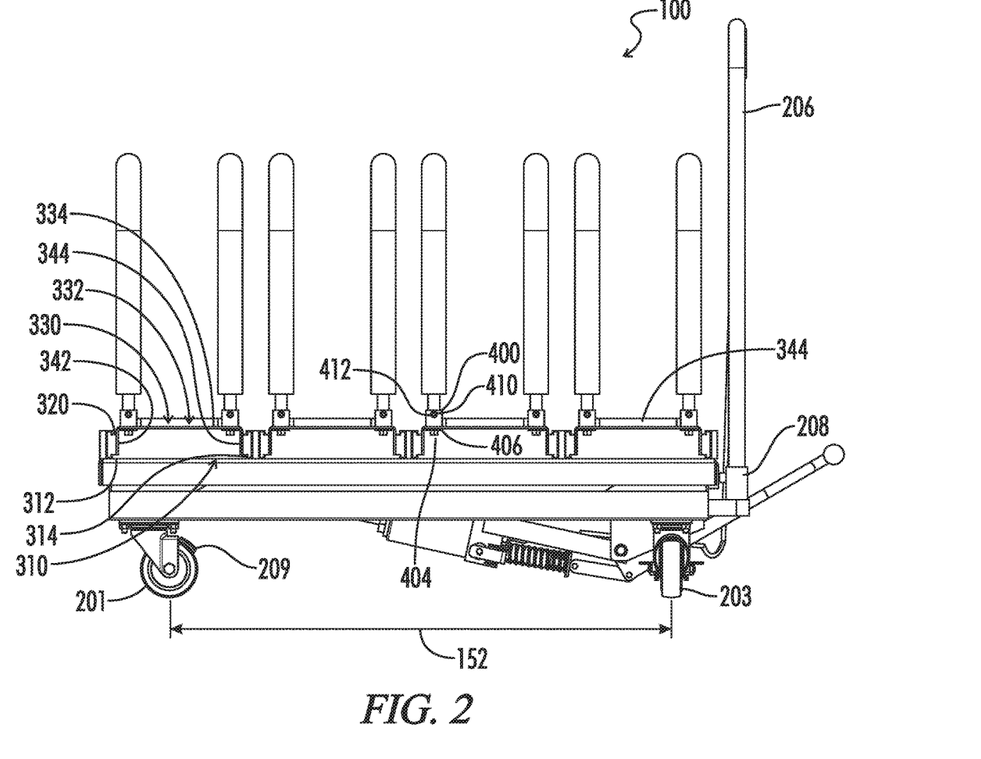
FIG. 2 is a left side view of the vehicle door removal and storage dolly in a retracted platform vertically collapsed position.
Figure 3:
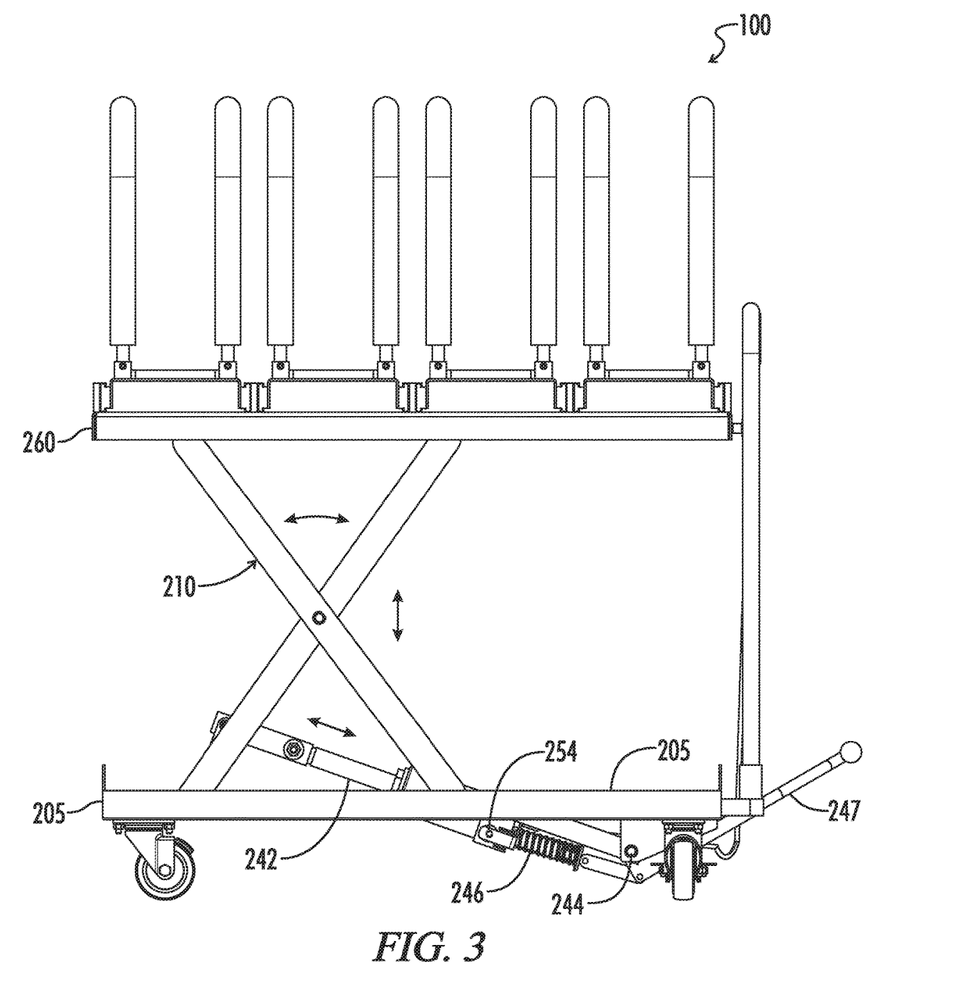
FIG. 3 is a left side view of the vehicle door removal and storage dolly in a retracted platform vertically raised position.
Figure 4:
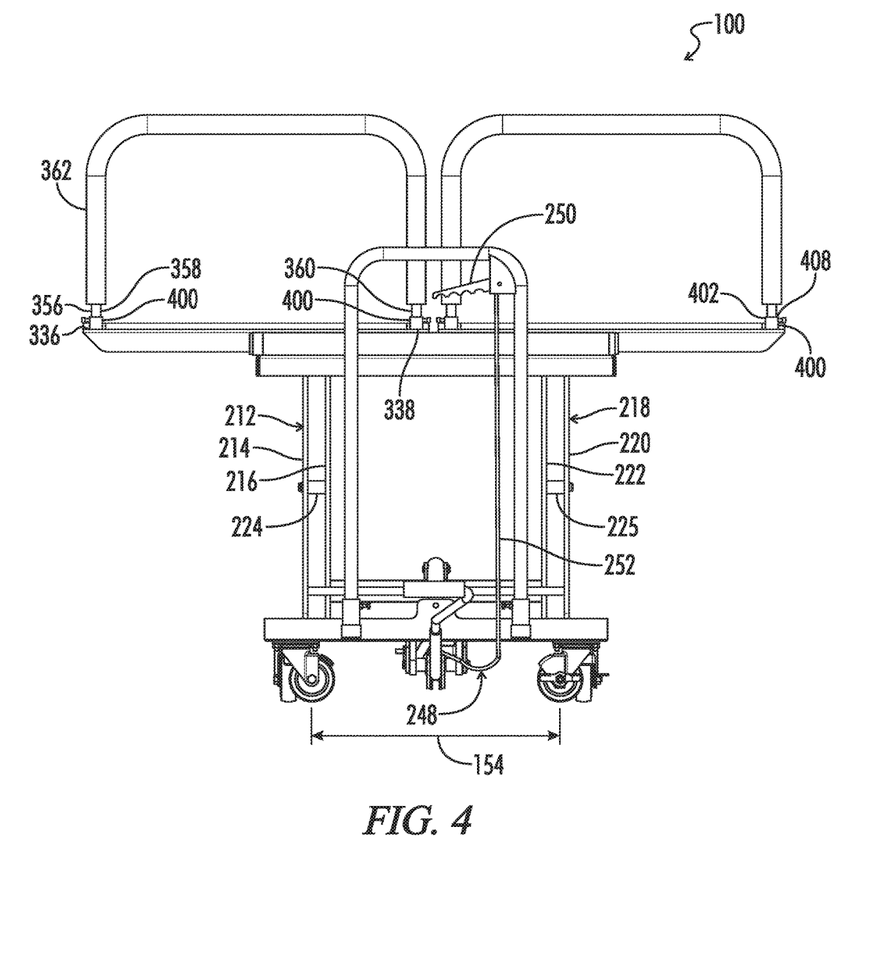
FIG. 4 is an end view of a vehicle door removal and storage dolly in a vertically raised position with all of the door support platforms in an extended position.
Figure 5:
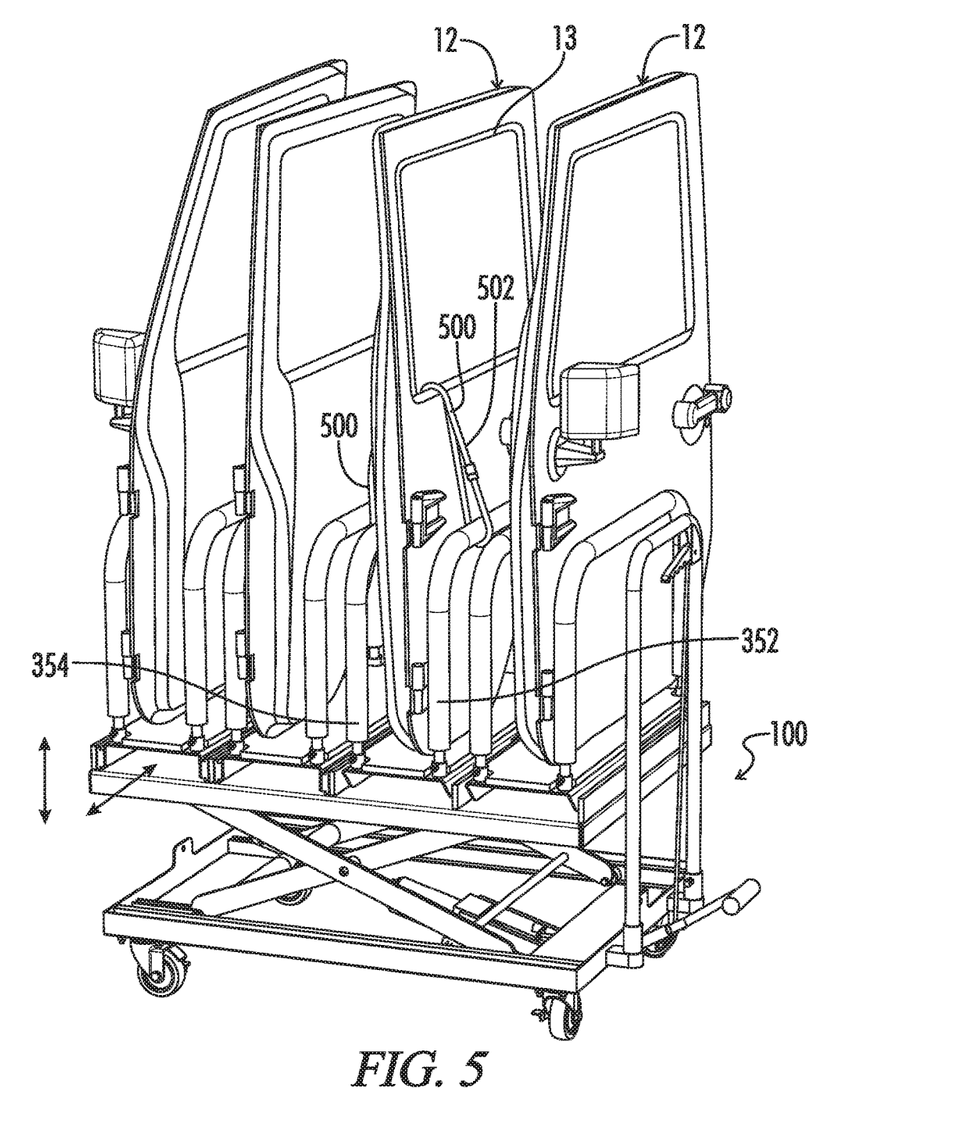
FIG. 5 is a perspective view of the vehicle door removal and storage dolly with four doors positioned on the dolly.
Figure 6:
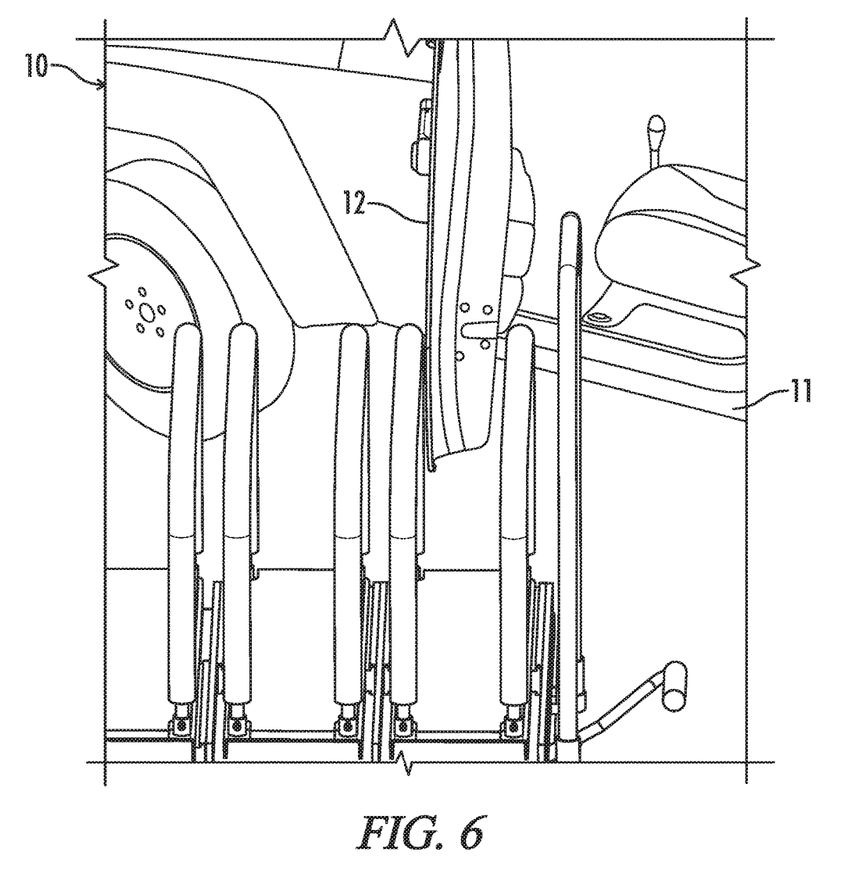
FIG. 6 is a perspective view showing the initial alignment of a door with the door support platform.
Figure 7:
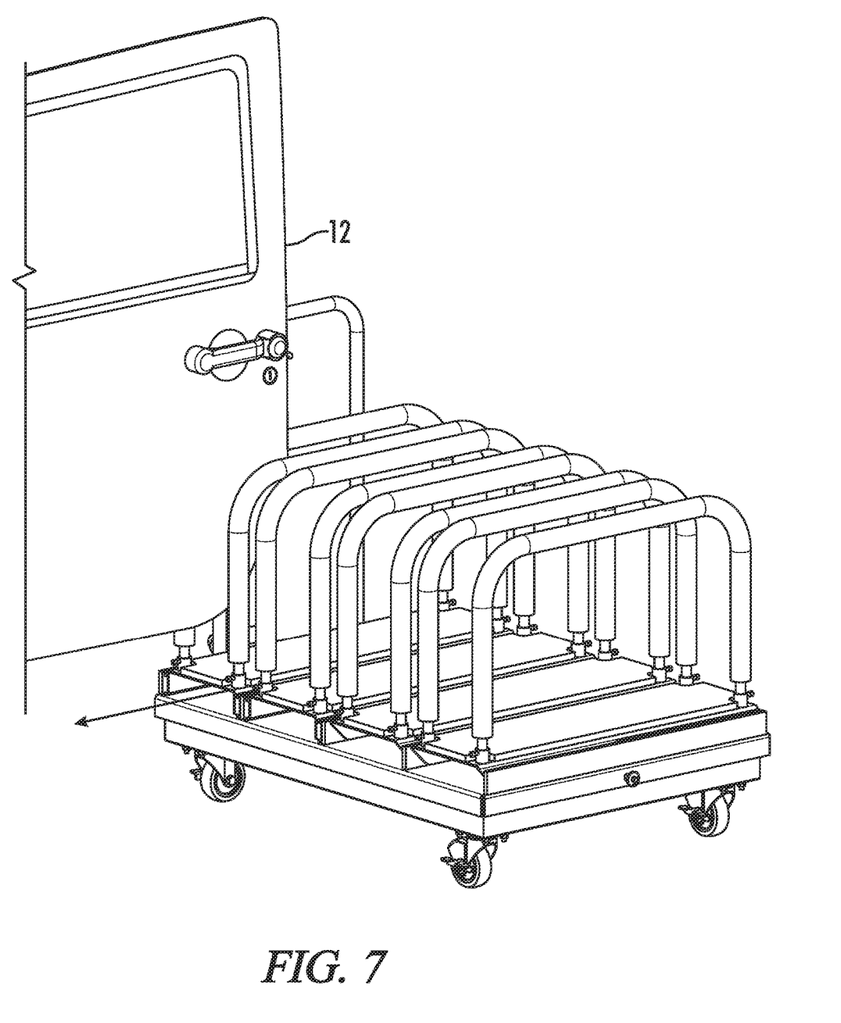
FIG. 7 is a perspective view showing the initial alignment of a door with the door support platform.
Figure 8:
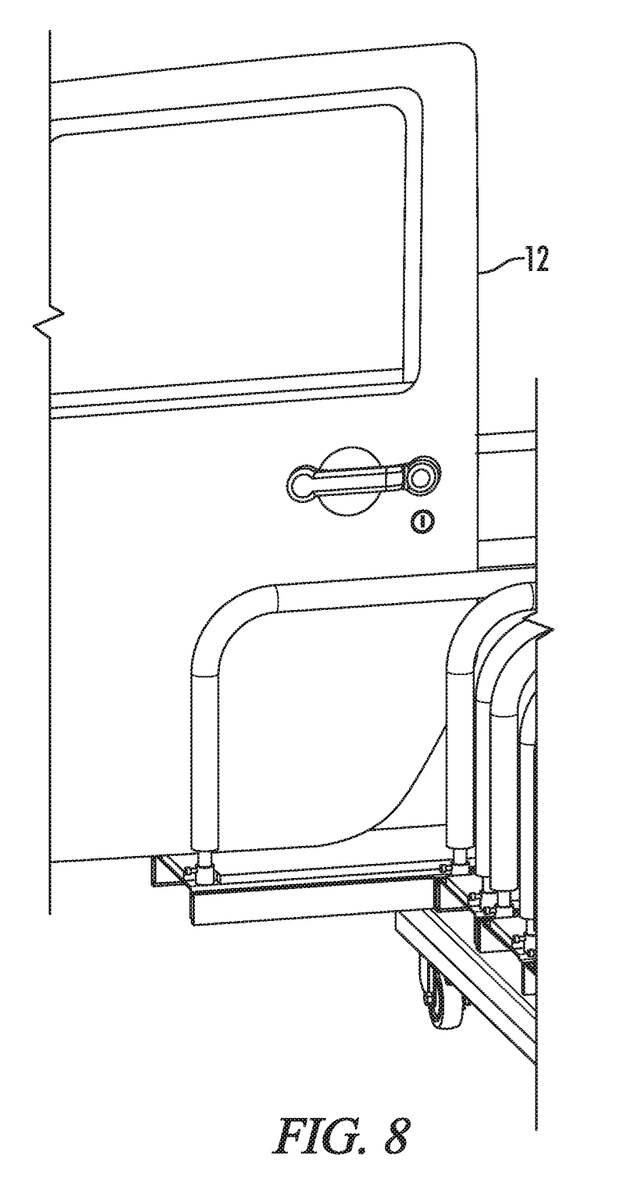
FIG. 8 shows another view of a door support platform extended under the vehicle door.
Figure 9:
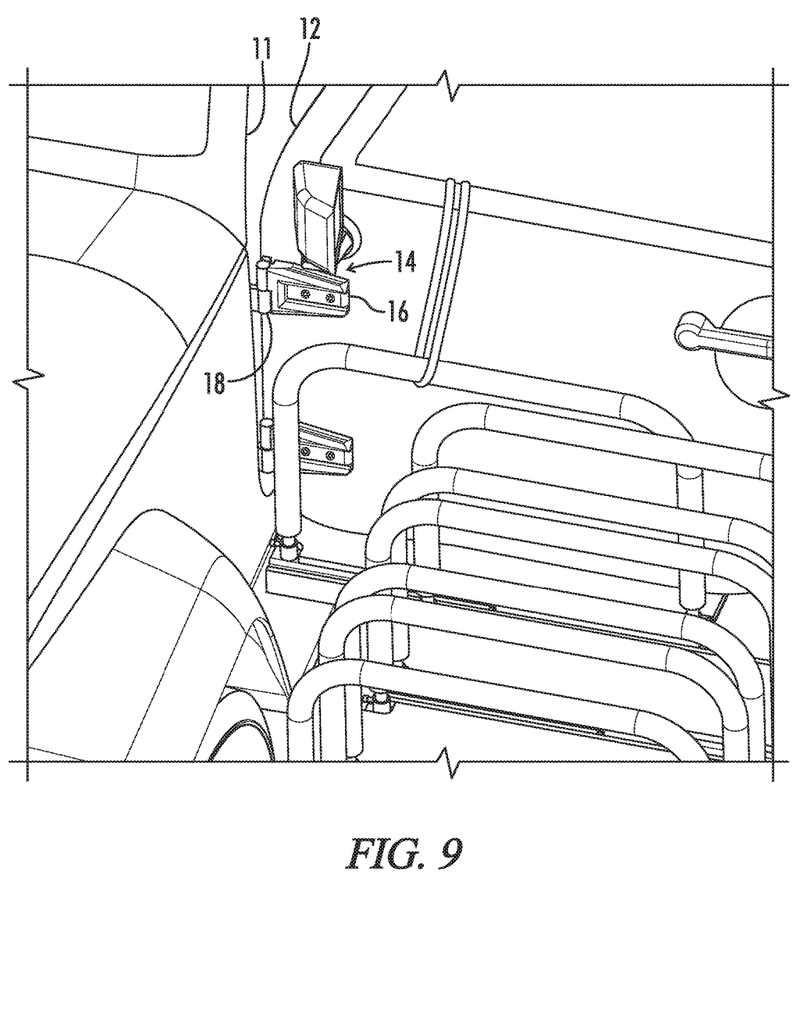
FIG. 9 shows another view of the door support platform extended under the vehicle door to an installation position.
Figure 10:
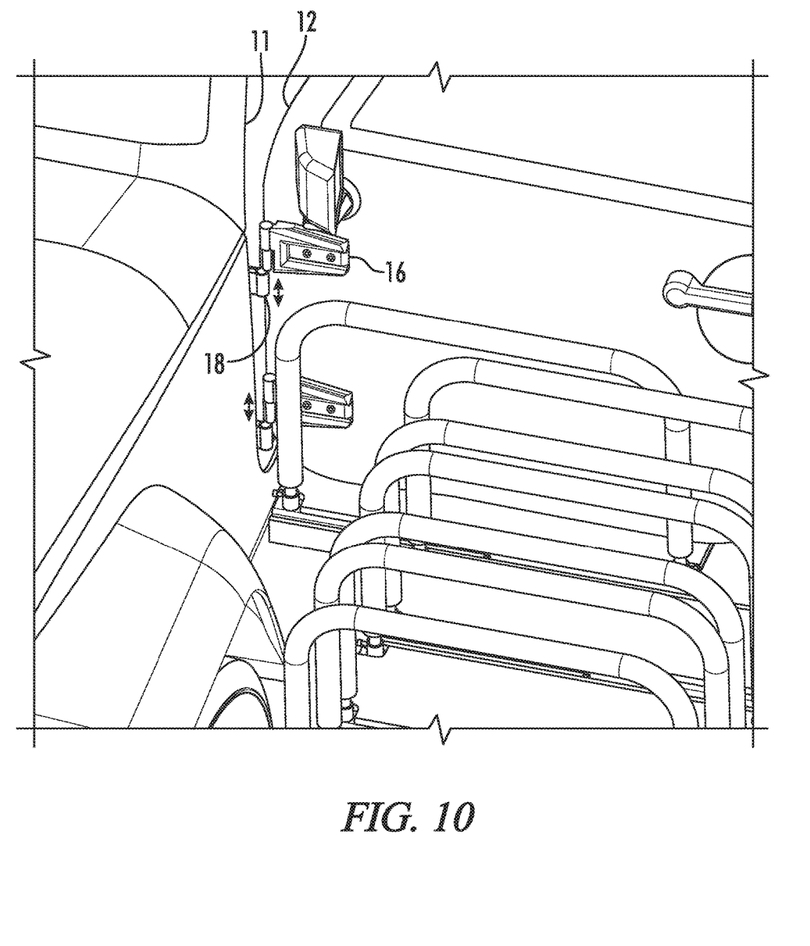
FIG. 10 shows a door being lifted off of its hinges by the vehicle door dolly.
Figure 11:
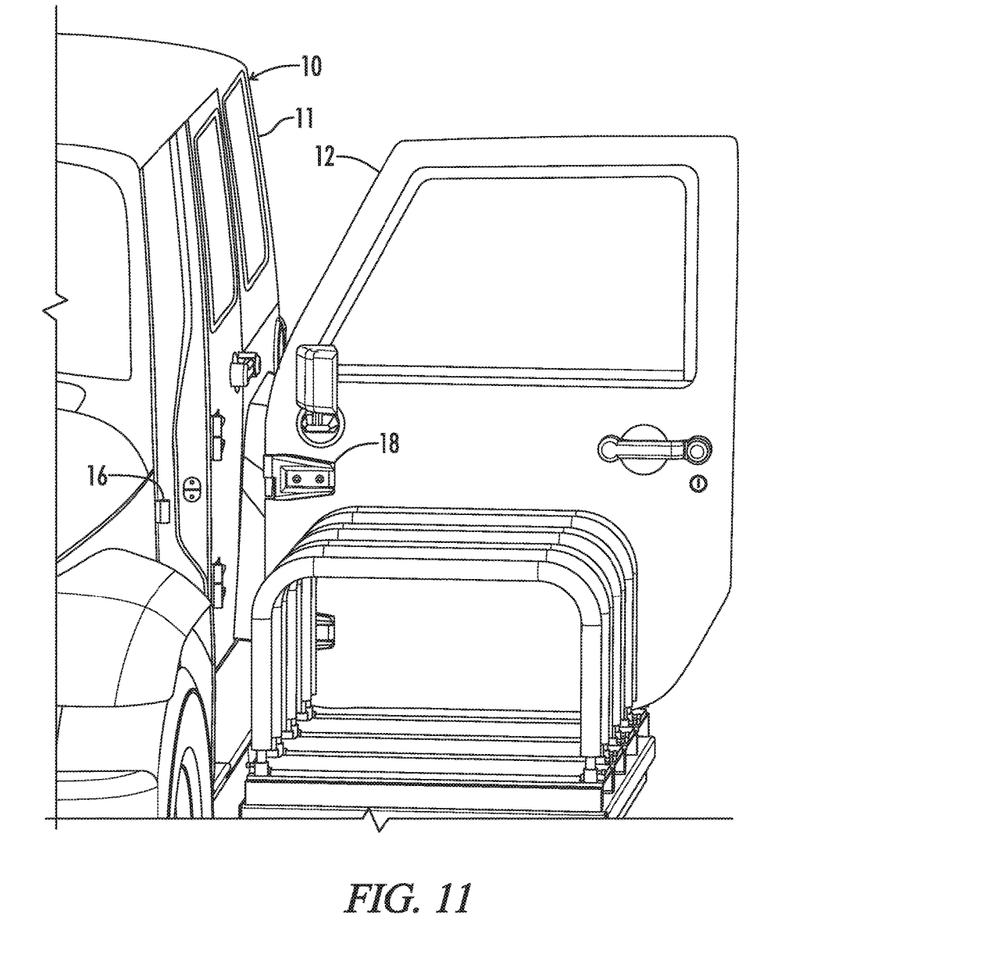
FIG. 11 shows the door platform supporting the door retracted back to a storage position on the vehicle door removal and storage dolly.

As shown in FIGS. 1 though 11 of the drawings, one exemplary embodiment of the present invention is generally shown as a vehicle door dolly 100 for use with a vehicle 10. The vehicle door dolly 100 includes a lifting base 200 with a lower frame 205 connected to a scissor frame 210 supportively moving an upper frame 260 with one or more extending door support platforms 300. The lifting base 200 allows for height control adjustment of the upper frame 260 to engage and disengage the door hinges and the extending door support 300 allows for keeping a distance from the dolly to the vehicle to avoid scratches and/or dent in the vehicle 10.

The lifting base. 200 is supported off of the floor by a front left swiveling caster wheel 201, front right swiveling caster wheel 202, back left swiveling caster wheel 203 and back right swiveling caster wheel 204 with one at each corner of the lower frame 205. The caster wheels can include a wheel lock 209 for locking the cart during door installation, door removal, or storage. The ground contact points define the ground contact area 150. The ground contact area 150 has a ground contact length 152 between the ground contact points of the front casters 201, 202 and back casters 203, 204 and a ground contact width 154 between the ground contact points of the left casters 201, 203 and right casters 202, 204. This is important because the center of gravity of the unit should always remain above the ground contact area 150, even when any assortment of one or more of the door support platforms 300 are extended with doors on them, to ensure that the dolly 100 is always stable. This can be enhanced by weighting the lower frame 205 with heavy construction of the frame, adding weights to the frame, or simply adding a water container that can be filled on site. The embodiment shown herein does not need any additional weight.

A handle 206 is removeably connected to the lower frame 205 with a handle base 208 so that the handle 206 may be compacted when the dolly 100 is being stored without any doors 12 on the dolly 100

A scissor frame 210 is connected to the lower frame 205 and the upper frame 260 to selectively lift and lower the upper frame 260 in relation to the lower frame 205. The scissor frame 210 includes a left cross frame 212 with a left outside bar 214 and left inside bar 216 pivotally connected by a left center pivot connecting bar 224 and a right cross frame 218 with a right outside bar 220 and right inside bar 222 pivotally connected by a right center pivot connecting bar 225. Both the left cross frame 212 and the right cross frame 218 include a fixed end 228 mounted with a fixed end pivot 230 and a sliding end 232 mounted with a moveable slide support 234 to allow for the scissor action. A biasing bar 236 connects the left cross frame 212 and the right cross frame 218 with a bar pivot 240 connected to a movement actuator 241 shown as a hydraulic ram 242 that provides the biasing force control to raise and lower the scissor action. Other movement actuators envisioned includes linear electrical actuators or even stepping motor driven screw jacks. The hydraulic ram 242 is also connected by a ram pivot 244 to the lower frame 205. A ram pump 246 with a foot lever 247 is used to pump hydraulic fluid to extend the hydraulic ram 242 with a pump release system 248 including a release handle 250 connected through a release cable 252 to a pump valve 254 being used to release pressure to allow gravity to provide force to retract the hydraulic ram 242. It is envisioned that a two directional pressurized ram control could be utilized in place of gravity for retraction, but gravity retraction is less complicated and provided the simple build for the embodiment seen here. In this embodiment, extending the ram 242 raises the upper frame 260 and retracting the ram 242 lowers the upper frame 260.

One unique aspect of the present invention is found in the extending door support platforms 300. The extending door support platforms 300 allows for the lifting base 200 to be kept away from the vehicle 10 to avoid scratching of the paint, dents, or other body damage. In the embodiment shown, four platforms 300 are shown including a first extending left platform 302, a second extending left platform 304, a first extending right platform 306, and a second extending right platform 308. By having the platforms extend on opposite sides such as the left side platforms 302, 304 and right side platforms 306, 308 we can ensure that no more than two platforms are extended at any one time to maintain the center of gravity above the ground contact area 150. Also, the amount of extension can be limited, such as a half or three quarter extension, in coordination with the base weighting and the ground contact area to maintain the appropriate center of gravity. Alternative designs could also use interlocks like those found on tool cabinets to ensure that only one platform 300 is extended at a time to maintain the proper location of the center of gravity.

Each platform 300 is made with a platform base 310 mounting extending drawer glides 320 to moveably support an extending shelf 330 with vertical door supports 350. Ball bearing extending drawer glides 320 are preferred. Note that in the embodiment shown, the extension axis 305 of the length of the platforms 302, 304, 306, 308 are parallel to each other across the side to side dimension of the dolly 100. This parallel positioning of the platforms 300 and the axial slide in and out arrangement of the drawer glides 320 allows for multiple doors 12, ie: two doors, three doors, or four doors, to be stored in close planar relationship by providing a parallel width alignment, parallel vertical alignment, and a minimal clearance close proximity arrangement with each door 12 protected by having its own padded platform 300.

The platform base 310 is formed as a simple U shaped channel with a first upward wall 312 and second upward wall 314. An extending drawer glide 320 is mounted to each wall 312, 314. The extending shelf 330 is an upside down U shaped body 332 that also has a first drop wall 342 and a second drop wall 344 that are connected to the extending drawer glides 320. The first drop wall 342 and a second drop 344 support the shelf top 334. The shelf top 334 defines first side clamp apertures 336 and second side clamp aperture 338 for mounting the vertical door supports 350.

The shelf top 334 is also padded with door support padding 344 that may be shaped to cradle or match the bottom of the door 12 to ensure that the door is properly positioned on the shelf top 334. For the simplicity of the preferred embodiment shown, vertical support for the door 12 is provided by vertical door supports 350 shown as a first shelf side support 352 and a second shelf side support 354. However, it is also envisioned that the shelf top 334 may have a vertical door support 350 formed on the non-extending end where the door latch will be positioned when a door is being supported. This would provide an upper extension similar to the latch side jamb, thereby forming an L shape formed by the bottom threshold and latch side jamb of the vehicle door opening on the vehicle 10, including a latch striker that can engage the door latch so that the door 12 will sit on the shelf top 334 similar to how it rests when installed on the vehicle and be locked onto the platform 300.

The side supports 352, 354 are made from a U shaped pipe 356 extending from a first end 358 to a second end 360. In the embodiment shown, they were constructed from metal electrical conduit bent to the shape shown. The ends 358, 360 are held in pipe clamps 400 mounted in the first side clamp apertures 336 and second side clamp aperture 338. The pipe 356 is covered in pipe padding 362 wherever it will make contact with the door 12.

Each pipe clamp 400 is made like a conduit end clamp used in electrical work and includes a clamp base 402 defining a pipe aperture 408, a side screw aperture 410, and a base extension 404. The base extension passes through the appropriate aperture 336, 338 to be secured with an extension nut 406. The pipe ends 358, 360 are secured in the pipe aperture 408 using a securing screw 412 mounted in the screw aperture 410. In this manner, the side supports 352, 354 can be removed and laid against the platforms 300 for compacted shipping.

A simple security lock 500 can be made as a securing strap 502 connected from the first shelf side support 352 through the window opening 13 of the vehicle door 12 to the second shelf side support 354 to securely lock the door 12 onto the dolly 100 for storage.

Reference numerals used throughout the detailed description and the drawings correspond to the following elements:

vehicle 10
  body 11
  removable doors 12
  window opening 13
  lift off hinges 14
    body hinge part 16
    door hinge part 18
  door bottom 20
  door top 30
Vehicle door dolly 100
  Ground contact area 150
    Ground contact length 152
    Ground contact width 154
  Lifting base 200
  front left swiveling caster wheel 201
  front right swiveling caster wheel 202
  back left swiveling caster wheel 203
  back right swiveling caster wheel 204
  Lower frame 205
  Handle 206
    Handle base 208
  wheel lock 209
  Scissor frame 210
    Left cross frame 212
      Left outside bar 214
      Left inside bar 216
    Right cross frame 218
      Right outside bar 220
      Right inside bar 222
    left center pivot connecting bar 224
    right center pivot connecting bar 225
      Fixed end 228
      Fixed end pivot 230
    Sliding end 232
      Slide support 234
    Biasing bar 236
      Bar pivot 240
  Hydraulic ram 242
  Ram pivot 244
  Ram pump 246
  foot lever 247
  Pump release system 248
    Release handle 250
    Release cable 252
    Pump valve 254

-continued

Upper frame 260
  Door support platform 300
    First left platform 302
    Second left platform 304
      extension axis 305
    First right platform 306
    Second right platform 308
  Platform base 310
    First upward wall 312
    Second upward wall 314
  Extending drawer glides 320
  Extending shelf 330
    U shaped body 332
  Shelf top 334
    First side clamp apertures 336
    Second side clamp aperture 338
      First drop wall 342
      Second drop wall 344
    Door support padding 344
    Vertical door support 350
      First shelf side support 352
      Second shelf side support 354
      U shaped pipe 356
        First end 358
        Second end 360
      Pipe padding 362
    Pipe clamp 400
      Clamp base 402
        Base extension 404
        Extension nut 406
        Pipe aperture 408
        Screw aperture 410
      Securing screw 412
  Security lock 500
    securing strap 502

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:
1. A vehicle door dolly apparatus for use with a vehicle including removable doors having a door bottom and a door top, comprising:

a lifting base including a lower frame and a scissor frame moveably connected to the lower frame;
an upper frame moveably supported by the scissor frame,
a door support platform connected to the upper frame, the door support platform supporting the door bottom;
a vertical door support connected to the upper frame, the vertical door support supporting the door top above the door bottom; and
a movement actuator connected to expand the scissor frame to move the upper frame away from the lifting base and retract the scissor frame to move the upper frame toward the lifting base
the door support platform including a first platform and a second platform;
a first extending glide moveably connecting the first platform to the upper frame to selectively position the first platform between a retracted position above the lifting base and an extended position extending past the lifting base;
a second extending glide moveably connecting the second platform to the upper frame to selectively position the second platform between a retracted position above the lifting base and an extended position extending past the lifting base.

2. The apparatus of claim 1, further comprising:
wheels connected to the lifting base.

3. The apparatus of claim 1, further comprising:
wheel locks connected to the wheels.

4. The apparatus of claim 1, further comprising:
a handle connected to the lower frame.

5. The apparatus of claim 1, further comprising:
the movement actuator including a hydraulic ram.

6. The apparatus of claim 5, further comprising:
a ram pump operated by a foot lever, the ramp pump flowably connected to the hydraulic ram.

7. The apparatus of claim 6, further comprising:
a pump release system including a pump valve flowably connected to the hydraulic ram.

8. The apparatus of claim 7, further comprising:
a release handle operable connected to operate the pump valve.

9. The apparatus of claim 1, further comprising:
the first platform extending in a direction opposite to extension of the second platform.

10. The apparatus of claim 1, further comprising:
a securing strap securing the door to the vertical door support.

* * * * *